(12) United States Patent
Snodgrass et al.

(10) Patent No.: US 6,950,036 B2
(45) Date of Patent: Sep. 27, 2005

(54) STATION IDENTIFICATION FOR A LOCAL AREA AUGMENTATION SYSTEM ON A VISUAL DISPLAY

(75) Inventors: Ken L. Snodgrass, Peoria, AZ (US); John A. Howell, III, New River, AZ (US); Robert S. Doyle, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 77 days.

(21) Appl. No.: 10/251,555

(22) Filed: Sep. 19, 2002

(65) Prior Publication Data

US 2003/0052800 A1 Mar. 20, 2003

Related U.S. Application Data

(60) Provisional application No. 60/324,035, filed on Sep. 20, 2001.

(51) Int. Cl.[7] .............................................. G08B 21/00
(52) U.S. Cl. ........................ 340/945; 340/948; 340/951; 342/35
(58) Field of Search ................................ 340/947–949, 340/945, 951, 953, 971, 972, 968; 342/33–35, 26; 341/66

(56) References Cited

U.S. PATENT DOCUMENTS 5,361,212 A * 11/1994 Class et al. ................... 701/16
5,786,773 A 7/1998 Murphy
6,119,055 A * 9/2000 Richman ...................... 701/16
2002/0008641 A1 * 1/2002 Sample el al. ............... 340/945

OTHER PUBLICATIONS

Satellite Operational Implementation Team (SOIT);"Local Area Augmentation System: LAAS Concept of Operations, Nov. 17, 1999;" 'Online!', Nov. 17, 1999, Section 3.6.2 "Tuning/Anunciation," p. 10–11, Section 3.6.2.1 "LAAS Channel Assignments," p. 11–12.

* cited by examiner

*Primary Examiner*—Jeffery Hofsass
*Assistant Examiner*—Jennifer Stone

(57) ABSTRACT

An aircraft on-board system for communicating with a ground-based radio transmitter forming a part of a Local Area Augmentation System for aiding in the navigation and landing of the aircraft, comprising a radio receiver adapted to receive signals, including identification signals identifying the Local Area Augmentation System, from the ground-based radio transmitter, a controller coupled to the radio receiver having an entry device for entering the channel number of a desired ground-based radio station and for tuning the on-board radio receiver to a desired frequency and further receiving from the radio signals, including the identification signals, and further having a signaling mechanism for providing to an operator of the aircraft on-board system a message including the identification of the ground-based radio station.

16 Claims, 1 Drawing Sheet

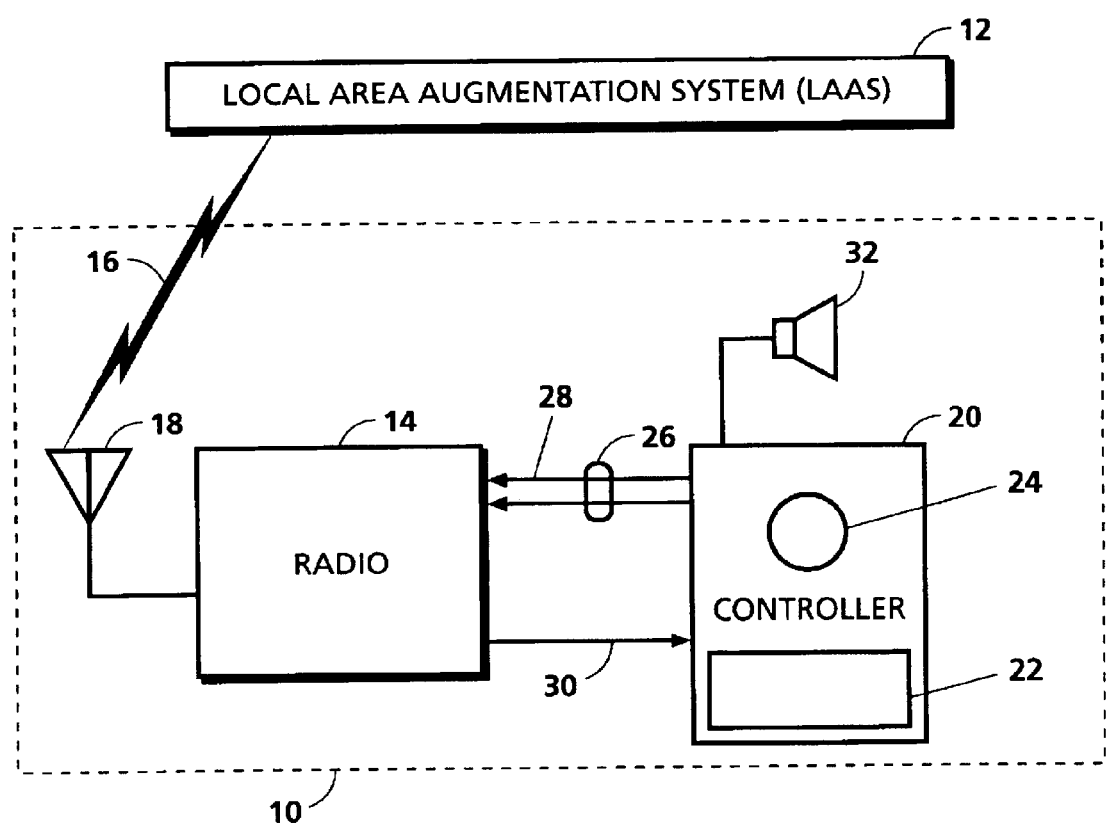

STATION IDENTIFICATION FOR A LOCAL AREA AUGMENTATION SYSTEM ON A VISUAL DISPLAY

CROSS REFERENCE TO RELATED APPLICATIONS

This application claims the benefit of U.S. Provisional Patent Application No. 60/324,035, filed Sep. 20, 2001.

TECHNICAL FIELD

The present invention relates to an aircraft navigational system, and more particularly to a Local Area Augmentation System.

BACKGROUND OF THE INVENTION

A Local Area Augmentation System (LAAS) is Global Positioning System (GPS) Landing System (GLS) used at some airports as a primary or auxiliary landing system for certain runways. The system comprises a ground-based radio receiver that receives signals from a plurality of satellites of the Global Positioning System, and a transmitter that is used to communicate a digital signal comprising certain navigation and landing information to aircraft wishing to avail themselves of the GLS as an aid to landing on the runway to which the GLS is dedicated.

It is possible that one or more of the satellites of the Global Positioning System may fail. In addition, the Global Positioning System is operated under the control of the U.S. Government, which can modify the accuracy of the GPS in the event of, for example, the use of the GPS by enemy aircraft or missiles. Thus the ground-based GPS receiver continually monitors the satellites for failure or inaccuracy and relates a correction factor as well as navigation and landing information to the aircraft.

In addition to the navigation and landing information carried on the digital uplink from the ground-based transmitter, LAAS systems transmit to the aircraft identification signals providing frequency and runway information that the pilot (or crewmember) of the aircraft can use to confirm that the transmission being received is for the runway and airport at which it is desired to land. Presently, unfortunately, all runway identifiers and radio frequencies are not unique.

In modern aircraft specifically equipped to implement a LAAS landing system, the aircraft radios, in conjunction with the aircraft's flight management system, are capable of automatically providing to the pilot confirmatory information regarding the frequency and runway of the LAAS station being received. In such systems, the destination runway may be entered into the flight management system as a part of the flight plan. The flight management system looks up the proper frequency for the LAAS system for the destination runway, tunes the appropriate radio to the frequency of the LAAS and automatically confirms, by monitoring the uplink signal from the LAAS that the information being received is from the proper LAAS station.

Retrofitting older aircraft without making extensive changes to the flight management system and cockpit display system, however, can leave the pilot with workload intensive methods to properly confirm station and runway identification signals. It would be advantageous to provide a retrofit controller capable of translating the radio signals transmitted by the LAAS ground-based unit into visual or aural signals to assist the pilot in properly identifying the radio station to which his radio is tuned.

BRIEF SUMMARY OF THE INVENTION

Such a system is provided by an aircraft on-board system for communicating with a ground-based radio transmitter forming a part of a Local Area Augmentation System for aiding in the navigation and landing of the aircraft, comprising a radio receiver adapted to receive signals, including identification signals identifying the Local Area Augmentation System, from the ground-based radio transmitter, a controller coupled to the radio receiver having an entry device for entering the channel number of a desired ground-based radio station and for tuning the on-board radio receiver to a desired frequency and further receiving from the radio signals, including the identification signals, and further having a signaling mechanism for providing to an operator of the aircraft on-board system a message including the identification of the ground-based radio station.

BRIEF DESCRIPTION OF THE DRAWINGS

The present invention will hereinafter be described in conjunction with the appended drawing FIGURE, where:

The FIGURE shows a block diagram of an aircraft radio and its associated controller in accordance with the instant invention.

DETAILED DESCRIPTION OF PREFERRED EXEMPLARY EMBODIMENTS

The following detailed description of a preferred embodiment is merely exemplary in nature and is not intended to limit the invention or the application and uses of the invention.

The FIGURE shows a communications system 10.for receiving station identification information from a Local Area Augmentation System (LAAS) 126, which is also referred to as a Ground Based Augmentation System, is illustrated according to a preferred exemplary embodiment of the present invention. In accordance with the present invention, the LAAS 12 is a Global Positioning System (GPS) Landing System or GLS, which is well known in the art. The communication system 10 comprises a radio 14 configured to at least receive the station identification from the LAAS 12 via a wireless link 16 with an antenna 18 or any number of reception devices. The communication system 10 also comprises a controller 20 in operable connection with the radio 14 that has a display 22 and a frequency tuning mechanism 24. The controller 20 is operably connected to the radio 14 with at least one coupler 26. The radio 14 is configurable for frequency tuning to a LAAS frequency by a frequency selection signal 28 of a runway identification frequency and for reception of a digital identification signal 30 corresponding to the LAAS channel to which the radio is tuned for reception.

In accordance with the present invention, the operator (not shown) adjusts the tuning mechanism 24 to select a runway identification frequency according to prescribed operating procedures, which are well known in the art and which typically vary according to type of vehicle. The tuning mechanism 24 tunes the radio to the frequency of the desired frequency selection signal 28, and the radio 14 receives the desired frequency selection signal 28. The radio 14, upon receipt of the uplink signal 16 providing the digital identification information such as a digital runway identifier, provides the digital identification information to the controller 20, and an image of the digital identification information is generated by the display 22. As can be appreciated by one of ordinary skill in the art, the communication system 10 of the FIGURE provides an image that can be viewed by the operator to confirm appropriate selection of the runway identification frequency.

In accordance with another embodiment of the communication system 10 of the FIGURE an audio reproduction device 32 is connected to the controller 20. However, as can be appreciated by one of ordinary skill in the art, the audio reproduction device 32 can be connected to the radio 14 or provided as an integral component of the controller 20 and/or radio 14. The audio reproduction device 32 is configured to receive the digital identification signal 30 and generate a unique audible signal for each of the unique digital identification signals corresponding to the unique identification information transmitted by the LAAS in the different frequencies. The unique audible signal can be any number of audible information schemes, such as Morse code. Morse code is today used as an identifying signal for Instrument Landing System (ILSs), VHF Omni Range systems (VORs) and other aviation navigation and landing aids. As can be appreciated by one of ordinary skill in the art, the unique audible generated by the audio reproduction device can be individually utilized by the operator to confirm appropriate selection of the runway identification frequency or in combination with the image generated by the display 22.

From the foregoing detailed description of preferred exemplary embodiments, it should be appreciated that apparatus and methods are provided for confirming in the cockpit of an aircraft the identification of a LAAS radio transmitter While preferred exemplary embodiments have been presented in the foregoing detailed description of preferred exemplary embodiments, it should be appreciated that other variations may exist. It should also be appreciated that these preferred exemplary embodiments are only examples, and are not intended to limit the scope, applicability, or configuration of the invention in any way. Rather, the ensuing detailed description will provide those skilled in the art with a convenient road map for implementing a preferred embodiment of the invention. It being understood that various changes may be made in the function and arrangement of elements described in an exemplary preferred embodiment without departing from the spirit and scope of the invention as set forth in the appended claims.

What is claimed is:

1. An aircraft on-board system for communicating with a ground-based radio transmitter forming a part of a Local Area Augmentation System for aiding in the navigation and landing of the aircraft, comprising:
   a radio receiver adapted to receive signals, including identification signals identifying the Local Area Augmentation System, from the ground-based radio transmitter,
   a controller coupled to the radio receiver comprising an entry device for entering a channel number of a desired ground-based radio station and for timing the on-board radio receiver to a desired frequency,
   the controller receiving identification signals from the radio receiver, and
   an output device connected to the controller for providing to an operator of the aircraft on-board system a message including the channel number of the ground-based radio station.

2. The aircraft on-board system as set forth in claim 1 wherein the output device is a display connected to the controller.

3. The aircraft on-board system as set forth in claim 2 wherein the identification signals further include the identity of a runway with which the LAAS is associated.

4. The aircraft on-board system as set forth in claim 3 wherein the display identifies the runway with which the LAAS is associated.

5. The aircraft on-board system as set forth in claim 1 wherein the output device produces an aural signal.

6. The aircraft on-board system as set forth in claim 5 wherein the identification signals further include the identity of a runway with which the LAAS is associated.

7. The aircraft on-board system as set forth in claim 6 wherein the aural signal identifies the runway with which the LAAS is associated.

8. In an aircraft on-board system for communicating with a ground-based radio transmitter forming a pert of a Local Area Augmentation System for aiding in the navigation and landing of the aircraft, the on-board system comprising a radio receiver and a controller coupled to the radio receiver, the controller comprising an entry device for entering the channel number of a desired ground-based radio station and for tuning the radio receiver to a desired frequency the controller further comprising an output device for providing to an operator of the aircraft on-board system a message including the identification of the ground-based radio station, the method comprising:
   receiving a channel number of a ground-based radio station;
   tuning the radio receiver to the frequency of the channel number;
   receiving identification signals, including the channel number of the ground based station, from the ground based station; and
   displaying the channel number received from the ground based receiver at the output device.

9. The method as set forth in claim 8 wherein the output device is a visual display connected to the controller.

10. The method as set forth in claim 8 wherein the identification signals further identify a runway with which the LAAS is associated.

11. The method as set forth in claim 10 wherein the visual display identifies the runway with which the LAAS is associated.

12. The method as set forth in claim 8 wherein the output device produces an aural signal.

13. The method as set forth in claim 12 wherein the identification signals further identify a runway with which the LAAS is associated.

14. The method as set forth in claim 13 wherein the aural signal identifies the runway with which the LAAS is associated.

15. The aircraft on board system as set forth in claim 5 wherein the aural signal identifies the runway with which the LAAS is associated using Morse code.

16. The method is set forth in claim 12 wherein the aural signal identifies the frequency of the ground-based radio transmitter using Morse code.

* * * * *